(12) United States Patent
Jiles et al.

(10) Patent No.: US 9,450,425 B2
(45) Date of Patent: Sep. 20, 2016

(54) APPARATUS AND METHOD FOR ALTERING THE PROPERTIES OF A BATTERY BY PROCESSING THROUGH THE APPLICATION OF A MAGNETIC FIELD

(71) Applicant: DynaPulse, L.L.C., Minnetonka, MN (US)

(72) Inventors: David C. Jiles, Ames, IA (US); Steffen Magnell, Plymouth, MN (US); Mani Mina, Ames, IA (US)

(73) Assignee: DynaPulse, L.L.C., Minnetonka, MN (US)

( * ) Notice: Subject to any disclaimer, the term of this patent is extended or adjusted under 35 U.S.C. 154(b) by 592 days.

(21) Appl. No.: 13/835,038

(22) Filed: Mar. 15, 2013

(65) Prior Publication Data

US 2014/0266023 A1    Sep. 18, 2014

(51) Int. Cl.
*H03K 3/00* (2006.01)
*H02J 7/00* (2006.01)
*H01M 10/42* (2006.01)
*H01M 6/50* (2006.01)

(52) U.S. Cl.
CPC .................. *H02J 7/00* (2013.01); *H01M 6/50* (2013.01); *H01M 10/42* (2013.01)

(58) Field of Classification Search
CPC ........................................................ H02J 7/00

USPC ......................................................... 307/106
See application file for complete search history.

(56) References Cited

U.S. PATENT DOCUMENTS

| | | | |
|---|---|---|---|
| 3,867,682 A * | 2/1975 | Yamauchi et al. | 320/139 |
| 2003/0160046 A1* | 8/2003 | Kikuchi | 219/680 |
| 2010/0079145 A1* | 4/2010 | Meisner et al. | 324/432 |
| 2013/0093428 A1* | 4/2013 | Tinnemeyer | 324/426 |

* cited by examiner

*Primary Examiner* — Jared Fureman
*Assistant Examiner* — Duc M Pham
(74) *Attorney, Agent, or Firm* — Pauly, Devries Smith & Deffner, LLC

(57) ABSTRACT

A system and method for altering the properties of a battery by exposure of the battery to a magnetic field is described herein. The method comprises generating a magnetic field; exposing a battery to the magnetic field, and determining the optimum settings of the magnetic field parameters for the particular material. The magnetic field may be time varying or time invariant. Various properties of the magnetic field can be altered to determine the optimum settings for altering the material properties, including the amplitude, frequency, and waveform. In one embodiment, a method for improving the performance of a battery is provided, comprising: providing a battery; temporarily installing a magnetic field generator along at least a portion of the battery; and generating a pulsed magnetic field around at least a portion of the battery using the magnetic field generator and simultaneously running a current through the battery.

15 Claims, 2 Drawing Sheets

APPARATUS AND METHOD FOR ALTERING THE PROPERTIES OF A BATTERY BY PROCESSING THROUGH THE APPLICATION OF A MAGNETIC FIELD

FIELD OF THE INVENTION

This disclosure relates generally to batteries and, more particularly, to the exposure of batteries to magnetic fields and related methods to alter their properties.

BACKGROUND

Worldwide billions of batteries are produced and sold every year. Some batteries are produced to replace batteries that have worn out and have been thrown away. Extending the life of batteries or making batteries more efficient can reduce waste and reduce the need to use resources to produce new batteries.

Inefficiencies in batteries result in substantial losses in energy and money. Thus, there remains a need in the art for improved batteries that would result in improved efficiencies, lower costs, and preservation of viable resources.

SUMMARY OF THE INVENTION

The present invention is directed in part to a method for altering the properties of a battery by exposure of the battery to a magnetic field, the method comprising: generating a magnetic field; exposing the battery to the magnetic field; and determining the optimum settings of the magnetic field for altering the properties of the battery in a controlled way. In one embodiment of the invention, a coil is used to generate a magnetic field, and a pulse generator is used to generate a waveform.

In the present invention, a battery is exposed to a magnetic field in order to alter the properties of the battery, and more specifically, to alter the performance of the battery. In one embodiment, the magnetic field may be time-varying. In another embodiment, the magnetic field may be time invariant. The magnetic field may be generated in any number of ways, including through the use of coils or other devices carrying an electric current or through the use of one or more permanent magnets. By exposing a battery to a magnetic field, any number of the properties of the battery may be altered, including, but not limited to, life span, efficiency, and output power. The magnetic field is typically varied over time.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed to a method for altering the properties of a battery by exposure of the battery to a magnetic field, comprising: generating a magnetic field; exposing a battery to the magnetic field; and determining the optimum values for the amplitude and frequency of the magnetic field in order to alter properties of the battery. The battery may comprise metals, polymers, composites, and ceramics.

In an example implementation, the invention is directed to a method for improving the performance of a battery, comprising: providing a battery; temporarily installing a magnetic field generator along at least a portion of the battery; and generating a pulsed magnetic field around the battery using the magnetic field generator. In an embodiment the method further comprises, simultaneously running a current through the battery.

In the present invention, a battery is exposed to a magnetic field. In one embodiment, the magnetic field may be time-varying. In another embodiment, the magnetic field may be time invariant. The magnetic field may be generated in any number of ways, including through the use of coils or other devices carrying an electric current or through the use of one or more permanent magnets. By exposing a battery to the magnetic field any number of the properties of the battery may be altered, including, but not limited to, life span, efficiency, and output power.

Figure 1:
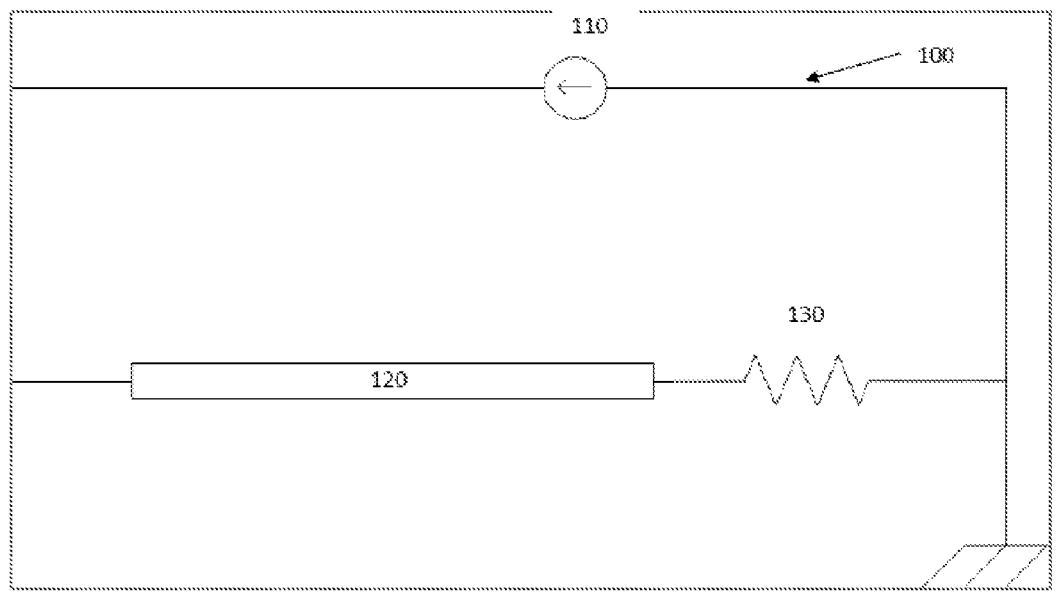
FIG. 1 is a circuit diagram illustrating one embodiment of a system used in the battery treatment method of the present invention.

In one embodiment, the present invention is directed to a system for subjecting a battery to a magnetic field for the purpose of altering the properties of the battery, comprising: a coil configured to generate a magnetic field; a pulse generator configured to generate a waveform; and a power supply configured to generate a current in the coil. FIG. 1 shows an example circuit diagram for exposing a battery to a magnetic field for the purpose of altering its properties with a DC power supply.

Figure 2:
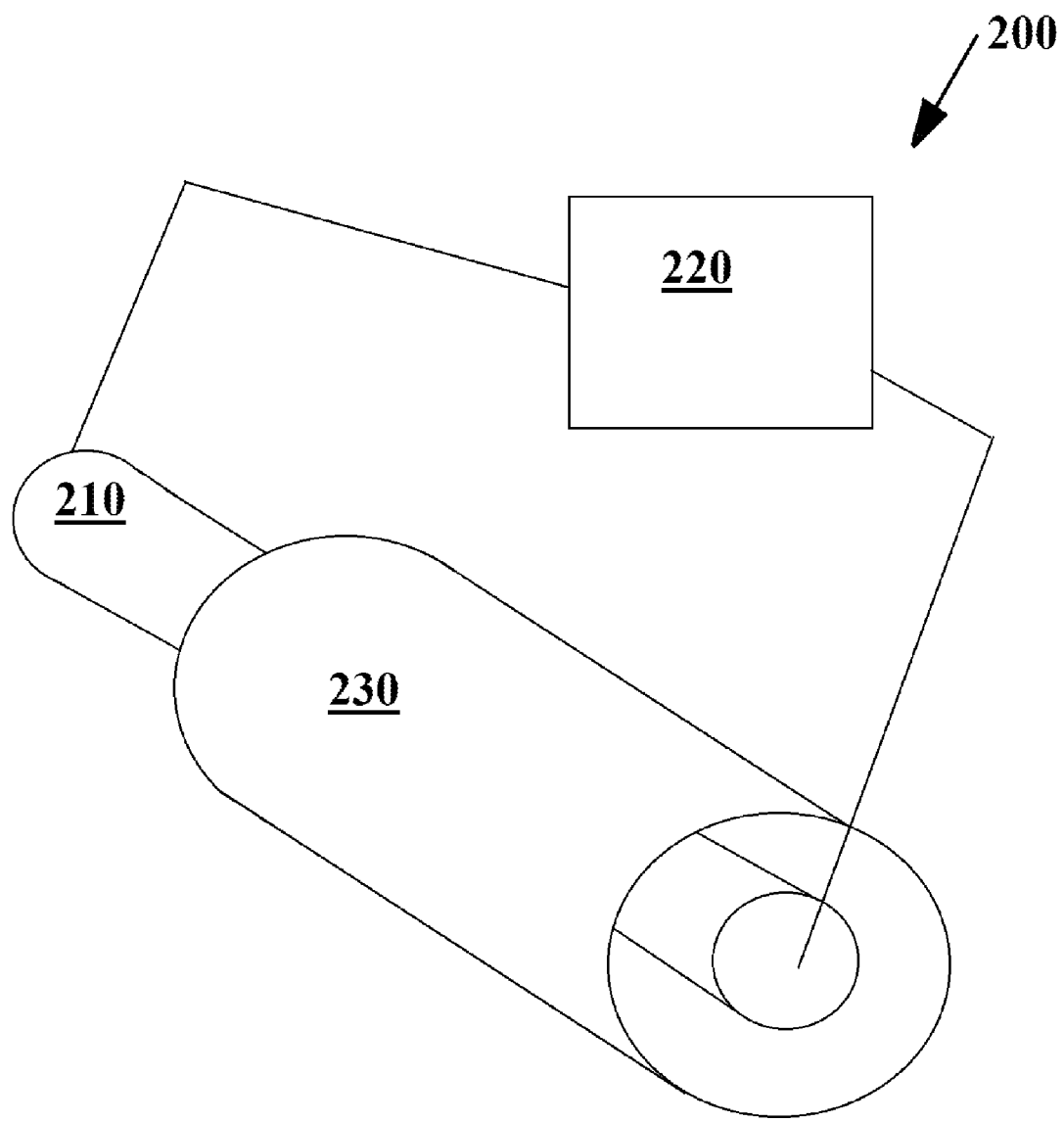
FIG. 2 is one embodiment of a system of the present invention used to treat a battery.

In one embodiment of the system 200, the battery is a lithium ion battery. 210a, 210b, as shown in FIG. 2. In the embodiment shown in FIG. 2, the circuitry 220 used for generating a current through the battery 210 is attached to the ends of the battery 210 to form a complete circuit. In one embodiment, the circuitry 220 includes a power supply and one or more resistors (not pictured), which are connected in series with the power line 210. A magnetic field generator 230 is used to generate a magnetic field around the battery 210. In a preferred embodiment, the magnetic field generator 230 produces a pulsed magnetic field.

In one embodiment, the magnetic field generator 230 may be an external wand for generating a magnetic field around the battery to be treated. In another embodiment, the magnetic field generator 230 may be a cylindrical chamber that is open-ended on both sides, as in the example in FIG. 2, or be a chamber with a clam shell design. In yet another embodiment, the magnetic field generator 230 may be a coil wrapped around the battery to be treated. The magnetic field generator 230 may comprise a power supply and a pulse generator to provide a pulsed magnetic field.

In one embodiment, the average strength of the magnetic field varies from 6 to 20 G. Where a magnetic field generator 230 is a coil, the average field strength may be approximately 6 G at the center of the coil and around 20 G around the edges of the coil. In another embodiments, the average magnetic field strength ranges from 6 to 40 G with a field strength of 6 G at the center of the coil and around 40 G around the edges of the coil. These ranges are also applicable where the magnetic field generator 230 is not coil. Also, fields outside of these ranges can be used in some implementations.

Magnetic fields can have different effects on batteries depending on the type of field exposure and on the type of battery. Magnetic fields to which batteries may be exposed may either be constant or pulsed. The field exposure may be from a direct current (DC) or alternating current (AC) source and may vary by amplitude, frequency, or waveform.

Optimum settings of a magnetic field must be determined for a given battery. Significantly, the optimum settings of a magnetic field for one battery may not be the same for a different battery. Thus, various settings must be tested for particular batteries. The settings include such values as amplitude, frequency, and waveform.

The field may oscillate with various waveforms, including sinusoidal wave, square wave, or triangle wave.

These effects are classified herein as irreversible and reversible. Irreversible effects cause changes in measurable properties of a battery, such as life span, efficiency, and output power. Reversible effects cause a change in a measurable property but then revert to their original values when the field is removed.

The system for subjecting a battery to a magnetic field for the purpose of altering the properties of the battery comprise: a coil configured to generate a magnetic field; a pulse generator configured to generate a waveform; and a power supply configured to generate a current in the coil. FIG. 1 shows an example circuit diagram 100 for exposing a battery to a magnetic field for the purpose of altering its properties with a DC power supply. In the configuration in FIG. 1, a DC current source 110 provides a current through a battery 120 in series with a resistor 130. The charged particles of the current should generate a magnetic field.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The invention claimed is:

1. A method for altering the properties of a battery, comprising:
   providing a battery;
   providing a magnetic field generator, the magnetic field generator comprising a cylindrical chamber; and
   generating a pulsed magnetic field within the cylindrical chamber of the magnetic field generator;
   maintaining the battery within the chamber when the battery is in the magnetic field, while simultaneously running a current through the battery, the current being maintained through the battery until the circuit reaches a steady state;
   wherein the generated pulsed magnetic field has an average field strength ranging from 6 to 40 G;
   wherein the battery demonstrates an improvement in power capacity after being exposed to the pulsed magnetic field.

2. The method of claim 1, wherein the generated magnetic field has an average field strength ranging from 6 to 20 G.

3. The method of claim 1, wherein the magnetic field generator provided comprises a coil, a pulse generator, and a power supply.

4. A method for improving a battery, comprising:
   providing a battery;
   providing a magnetic field generator, the magnetic field generator comprising a cylindrical chamber; and
   generating a pulsed magnetic field around a battery for a period of time
   maintaining the battery within the chamber when the battery is in the magnetic field, while simultaneously running a current through the battery, the current being maintained through the battery until the circuit reaches a steady state;
   wherein the generated pulsed magnetic field has an average field strength ranging from 6 to 40 G;
   wherein the battery demonstrates an improvement in power capacity after being exposed to the pulsed magnetic field.

5. The method of claim 4, wherein the period of time is approximately five minutes.

6. The method of claim 4, wherein the pulsed magnetic field is generated using a coil and pulse generator.

7. The method of claim 6, wherein the generated pulsed magnetic field has an average field strength ranging from 6 to 40 G within the coil.

8. The method of claim 6, wherein the generated pulsed magnetic field has an average field strange ranging from 6 to 20 G within the coil.

9. The method of claim 4, wherein the pulsed magnetic field is generated using a wand.

10. The method of claim 4, further comprising running a current through the battery; wherein current running through the battery is approximately 4 to 5 Amps.

11. A system for improving capacity of a battery, comprising:
    a battery;
    a magnetic field generator comprising a cylindrical chamber configured to retain a battery within the chamber, the cylindrical chamber configured to generate a magnetic field 6 to 20 G around the battery, the chamber further configured to allow a current to be run through a battery within the cylindrical chamber; and
    at least one of a current or voltage source.

12. The system of claim 11, wherein the magnetic field generator produces a pulsed magnetic field.

13. The system of claim 12, wherein the magnetic field generator comprises a coil, a pulse generator, and a power supply.

14. The system of claim 11, wherein the magnetic field generator comprises an external wand.

15. The system of claim 11, further comprising a resistor, wherein the resistor is in series with the battery, and the current or voltage source.

\* \* \* \* \*